United States Patent
B

(10) Patent No.: US 10,656,843 B2
(45) Date of Patent: May 19, 2020

(54) SYSTEMS AND METHODS FOR WEAR LEVELLING IN A STORAGE ARRAY

(71) Applicant: Dell Products L.P., Round Rock, TX (US)

(72) Inventor: Kanaka Charyulu B, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 15/155,678

(22) Filed: May 16, 2016

(65) Prior Publication Data

US 2017/0329536 A1 Nov. 16, 2017

(51) Int. Cl.
*G06F 3/06* (2006.01)
*G06F 12/02* (2006.01)
*G06F 13/42* (2006.01)
*G06F 9/50* (2006.01)

(52) U.S. Cl.
CPC .......... *G06F 3/0616* (2013.01); *G06F 3/061* (2013.01); *G06F 3/0617* (2013.01); *G06F 3/0631* (2013.01); *G06F 3/0664* (2013.01); *G06F 3/0689* (2013.01); *G06F 9/50* (2013.01); *G06F 12/02* (2013.01); *G06F 13/42* (2013.01)

(58) Field of Classification Search
None
See application file for complete search history.

(56) References Cited

U.S. PATENT DOCUMENTS

| | | | |
|---|---|---|---|
| 8,621,141 B2 | 12/2013 | Mudama et al. | |
| 9,195,588 B2 | 11/2015 | Cepulis | |
| 2007/0016754 A1* | 1/2007 | Testardi | G06F 3/0611 711/206 |
| 2010/0077252 A1* | 3/2010 | Siewert | G06F 11/008 714/6.12 |
| 2010/0250831 A1* | 9/2010 | O'Brien | G06F 11/3433 711/103 |
| 2010/0287345 A1* | 11/2010 | Cherian | G06F 3/0604 711/162 |
| 2011/0302358 A1* | 12/2011 | Yu | G06F 11/108 711/103 |
| 2014/0108754 A1* | 4/2014 | Kawaguchi | G06F 3/0617 711/162 |
| 2015/0052300 A1* | 2/2015 | Piekarski | G06F 3/0604 711/114 |

\* cited by examiner

*Primary Examiner* — Masud K Khan
(74) *Attorney, Agent, or Firm* — Jackson Walker L.L.P.

(57) ABSTRACT

In accordance with embodiments of the present disclosure, a system may include a processor and a storage interface configured to sequentially select, one at a time, member storage resources of a virtual storage resource as a source storage resource for redirection of write input/output (I/O) and for each member storage resource, when selected as the source storage resource, in response to write I/O, redirect the write I/O to a spare storage resource available to the virtual storage resource.

21 Claims, 6 Drawing Sheets

SYSTEMS AND METHODS FOR WEAR LEVELLING IN A STORAGE ARRAY

TECHNICAL FIELD

The present disclosure relates in general to information handling systems, and more particularly to wear levelling among individual physical storage resources of an array of physical storage resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "virtual storage resource." Implementations of storage resource arrays can range from a few storage resources disposed in a server chassis, to hundreds of storage resources disposed in one or more separate storage enclosures.

As a specific example, a user may implement a RAID configuration including one or more servers coupled to a number of storage enclosures containing hundreds of storage resources. In a typical configuration, a RAID may include active storage resources making up one or more virtual storage resources and one or more spare storage resources (also known as "hot spares"). In such a configuration, the storage resources configured as active spares generally may remain idle until a virtual storage resource suffers a failure of one of its active storage resources, at which time the virtual storage resource may rebuild itself using an active spare. However, such a configuration may not allow for optimal wear leveling of physical storage resources. Because a spare storage resource may not be part of a RAID, the spare storage resource may be excluded from all input/output (I/O) operations, including write operations. As a result, the spare storage resource may experience little, if any, write wear while active storage resources in the RAID may experience wear. Thus, the spare storage resource may remain at or near 100% remaining lifetime while active storage resources will, over time, approach the end of their lifetimes and fail. Accordingly, existing configurations have disadvantages and inefficiencies.

SUMMARY

In accordance with the teachings of the present disclosure, the disadvantages and problems associated with traditional approaches to wear levelling or physical storage resources may be reduced or eliminated.

In accordance with embodiments of the present disclosure, a system may include a processor and a storage interface configured to sequentially select, one at a time, member storage resources of a virtual storage resource as a source storage resource for redirection of write input/output (I/O) and for each member storage resource, when selected as the source storage resource, in response to write I/O, redirect the write I/O to a spare storage resource available to the virtual storage resource.

In accordance with these and other embodiments of the present disclosure, a method may include sequentially selecting, one at a time, member storage resources of a virtual storage resource as a source storage resource for redirection of write input/output (I/O) and for each member storage resource, when selected as the source storage resource, in response to write I/O, redirecting the write I/O to a spare storage resource available to the virtual storage resource.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to sequentially select, one at a time, member storage resources of a virtual storage resource as a source storage resource for redirection of write input/output (I/O) and for each member storage resource, when selected as the source storage resource, in response to write I/O, redirect the write I/O to a spare storage resource available to the virtual storage resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
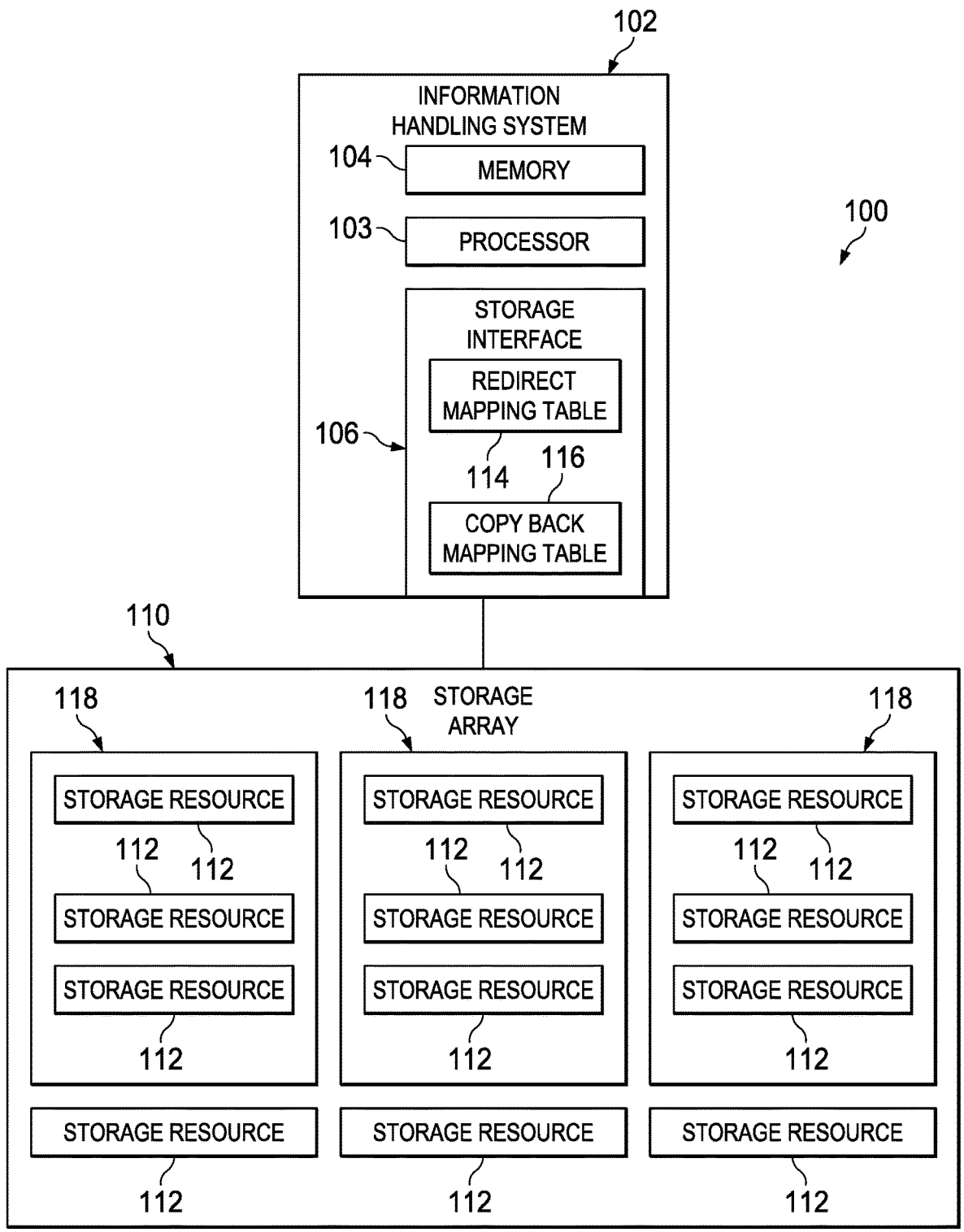
FIG. 1 illustrates a block diagram of an example system having an information handling system coupled to a storage array, in accordance with embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having an information handling system 102 coupled to a storage array 110, in accordance with embodiments of the present disclosure.

In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a processor 103, a memory 104 communicatively coupled to processor 103, and a storage interface 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage interface 106, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage interface 106 may be communicatively coupled to processor 103 and may include any system, device, or apparatus configured to serve as an interface between processor 103 and storage resources 112 of storage array 110 to facilitate communication of data between processor 103 and storage resources 112 in accordance with any suitable standard or protocol. In some embodiments, storage interface 106 may comprise a network interface configured to interface with storage resources 112 located remotely from information handling system 102. In these and other embodiments, storage interface 106 may comprise a storage controller (e.g., a RAID controller). As shown in FIG. 1, storage interface 106 may have stored therein (e.g., in a computer-readable medium integral to storage interface 106) or otherwise accessible thereto, metadata including a redirect mapping table 114 and a copy back mapping table 116. As described in greater detail below, redirect mapping table 114 may include a list, map, database, table, or other data structure including entries relating a first address on a source active storage resource 112 to a second address on a spare storage resource 112 to which data intended for the first address has been redirected. As described in greater detail below, copy back mapping table 116 may include a list, map, database, table, or other data structure including entries setting forth addresses on a source active storage resource 112 to which data has been written during a copy back operation.

In addition to processor 103, memory 104, and storage interface 106, information handling system 102 may include one or more other information handling resources.

Storage array 110 may include a plurality of physical storage resources 112. Storage resources 112 may be disposed in one or more storage enclosures configured to hold and power storage resources 112. Storage resources 112 may include hard disk drives, magnetic tape libraries, optical disk drives, magneto-optical disk drives, compact disk drives, compact disk arrays, disk array controllers, and/or any other system, apparatus or device operable to store media. In some embodiments, storage array 110 may comprise a user-created pool of optimal (e.g., non-degraded) virtual storage resources 118.

In operation, one or more storage resources 112 may appear to an operating system or virtual machine executing on information handling system 102 as a single logical storage unit or virtual storage resource 118. For example, each such virtual storage resource 118 may comprise a RAID. Thus, in some embodiments, a virtual storage resource 118 may comprise a redundant array of storage resources 112, wherein at least one of the storage resources 112 making up the virtual storage resource 118 enables data redundancy in order to avoid loss of data in the event of failure and/or removal of one of the storage resources making up the virtual storage resource. In the same or alternative embodiments, virtual storage resource 118 may be implemented using a RAID standard.

In addition to active storage resources 112 which may be members of virtual storage resources 118, storage array 110 may include one or more storage resources 112 acting as "spares." A spare storage resource 112 may also be referred to as a "hot spare" (particularly when used in a RAID implementation) and be any storage resource that is configured to replace an active storage resource 112 that has failed and/or been removed. In certain embodiments, storage array 110 may be configured such that a detection of a failure of an active storage resource 112 automatically initiates the replacement of the failed storage resource with a spare storage resource 112. In embodiments employing redundancy, the availability of spare storage resources 112 may reduce a repair period during which a second storage resource failure in the same virtual storage resource 118 group can result in loss of data.

In addition, and as described in greater detail elsewhere in this disclosure, in the absence of a failure of any active storage resource 112 of a virtual storage resource 118, storage interface 106 may manage I/O in order to perform wear levelling by redirecting only current and active write I/O for a source active storage resource 112 to a spare storage resource 112 (while leaving previously written data on source storage resource 112), copying back unmodified data from the spare storage resource 112 to the source active storage resource 112 after a period of time, and periodically selecting different active storage resources 112 as the source active storage resource 112 for the redirection and copy back of write I/O.

Although in the embodiment depicted in FIG. 1 each virtual storage resource 118 is shown as including three storage resources 112, it is understood that a virtual storage resource 118 may comprise any number of storage resources.

In addition to storage resources 112, storage array 118 may include one or more other information handling resources.

In addition to information handling system 102 and storage array 110, system 100 may include one or more other information handling resources.

Figure 2A:
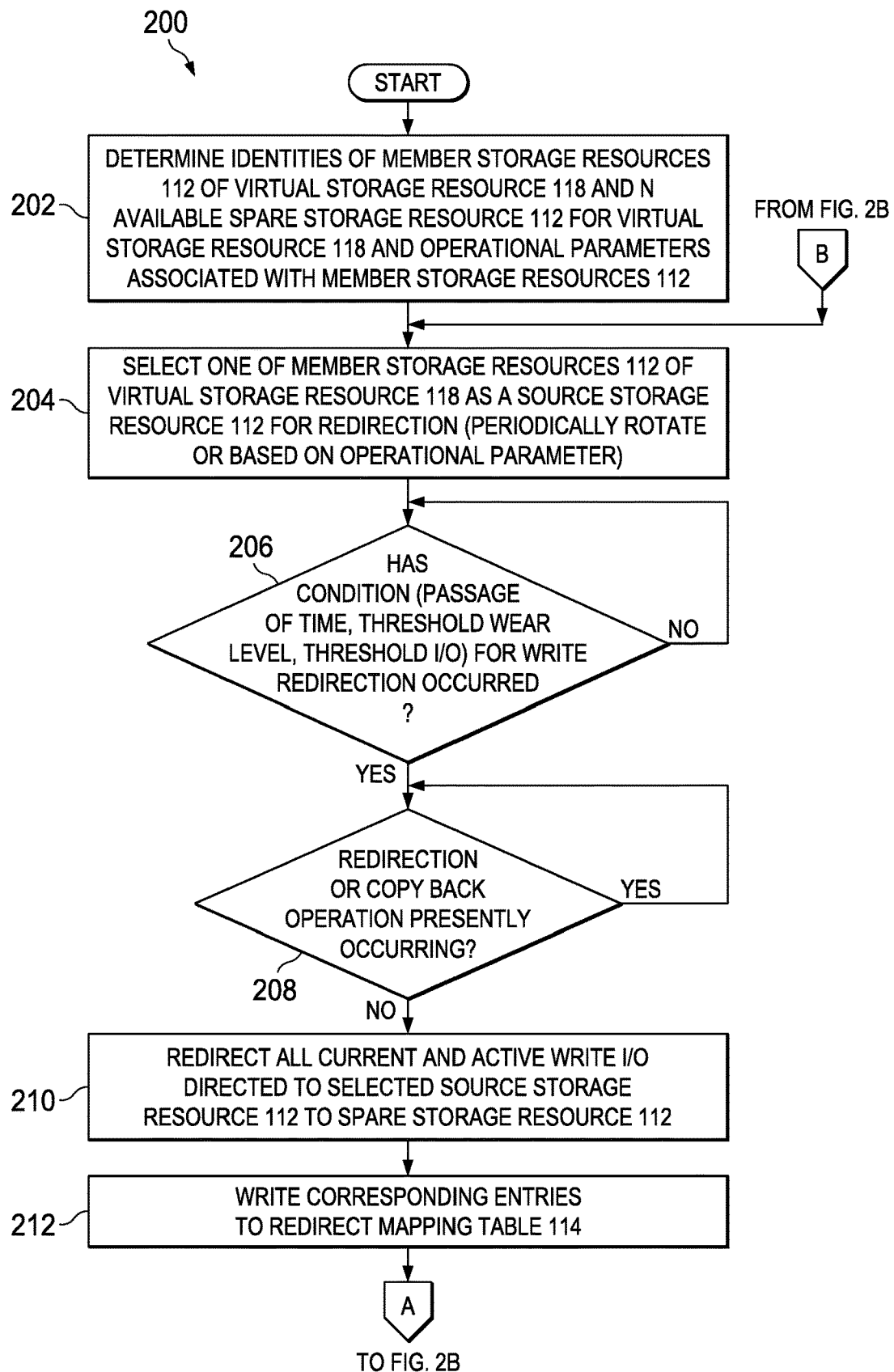
FIGS. 2A and 2B illustrate a flow chart of an example method for wear levelling in a storage array, in accordance with embodiments of the present disclosure.
Figure 2B:
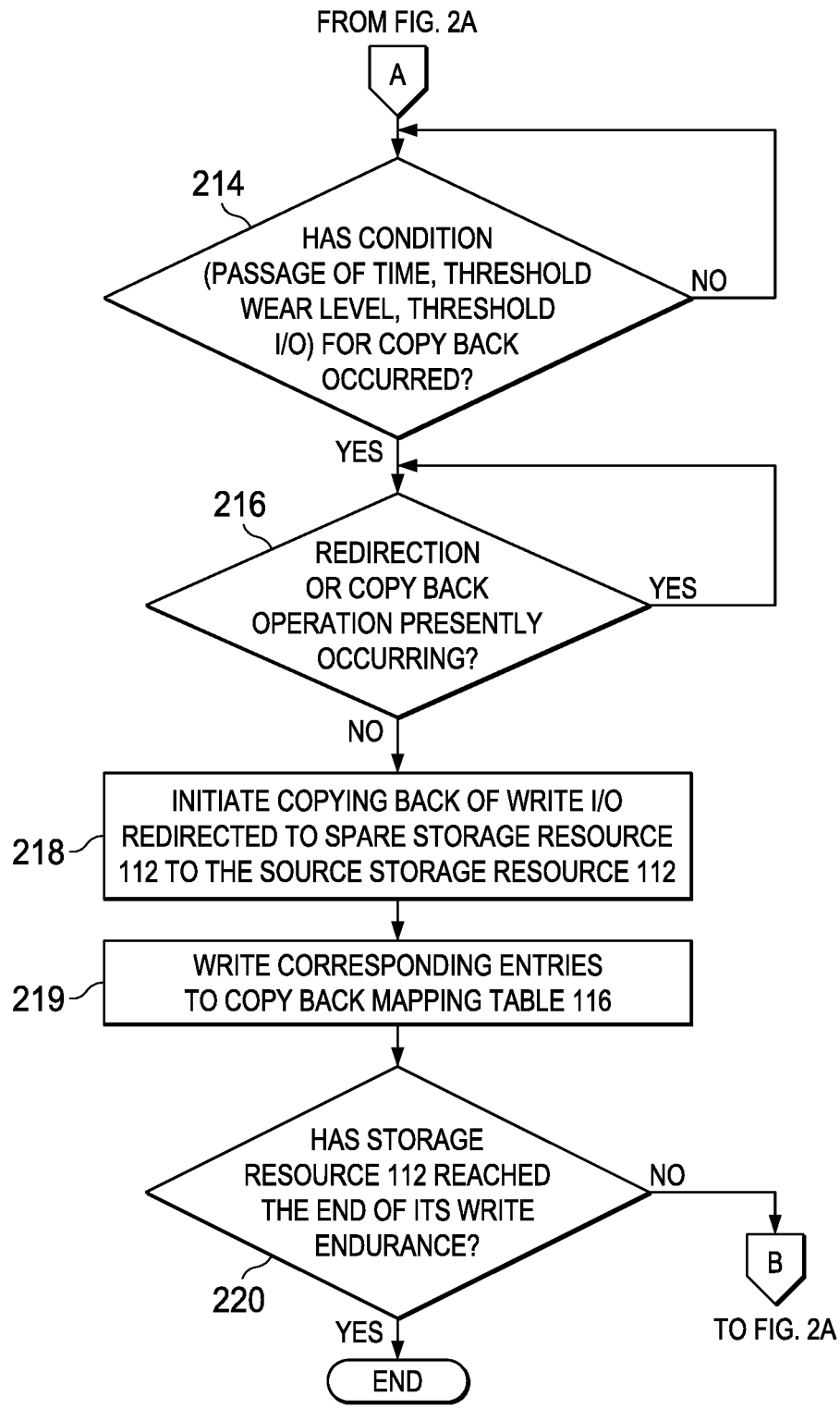

FIGS. 2A and 2B (which may be referred to herein collectively as "FIG. 2") illustrate a flow chart of an example method 200 for wear levelling in a storage array, in accordance with embodiments of the present disclosure. According to certain embodiments, method 200 may begin at step 202. As noted above, teachings of the present disclosure may be implemented in a variety of configurations of system 100 as shown in FIG. 1. As such, the preferred initialization point for method 200 and the order of the steps comprising method 200 may depend on the implementation chosen.

At step 202, storage interface 106 may determine identities of member storage resources 112 of a virtual storage resource 118 and an available spare storage resource 112 for the virtual storage resource 118 and one or more operational parameters associated with such member storage resources 112 (e.g., remaining write endurances, etc.). At step 204, storage interface 106 may select one of the member storage resources 112 of the virtual storage resource 118 as a source storage resource 112 for redirection. In some embodiments, such selection may be made such that member storage resources 112 are periodically selected in order as the source storage resource 112 for redirection. In other embodiments, storage interface 106 may intelligently select the member storage resource 112 based on one or more operational parameters associated with member storage resources 112 (e.g., select the member storage resource 112 with the lowest remaining write endurance).

At step 206, storage interface 106 may determine whether a condition for write redirection has occurred. In some embodiments, the condition may include a passage of time since the most recent write redirection process. Such interval of time may be chosen to be a short enough period of time to render wear of the member storage resources 112 reasonably even over the expected life of the virtual storage resource 118 and/or short enough that the amount of write I/O redirected is not a significant fraction of a member storage resource's storage capacity. Accordingly, in such embodiments, storage interface 106 may periodically rotate at set intervals (e.g., once a week, twice a month, etc.) the member storage resource 112 selected as the source storage resource 112. In some of such embodiments, such interval of time may be variable to account for wear (e.g., the interval may be shortened if write I/O wear is rapidly increasing and redirected write I/O may fill spare storage resource 112; or the interval may be increased otherwise), so as to render wear leveling amongst member storage resources 112 and the spare storage resource 112 as smooth as possible while avoiding too many source storage resource 112 changes within a short duration. In other embodiments, the condition may comprise a wear level of the source storage resource 112 attaining a particular threshold (e.g., a decrease in write endurance of the source storage resource 112 by a particular percentage of its maximum write endurance). In yet other embodiments, the condition may comprise an I/O level of the source storage resource 112 attaining a particular threshold (e.g., a decrease in storage capacity of the source storage resource 112 by a particular percentage of its maximum storage capacity). If the condition for write redirection has occurred, method 200 may proceed to step 208. Otherwise, method 200 may remain at step 206 until the condition for write redirection has occurred.

At step 208, storage interface 106 may determine whether a redirection or copy back operation is presently occurring between a member storage resource 112 and the spare storage resource 112. If a redirection or copy back operation is not presently occurring between a member storage resource 112 and the spare storage resource 112, method 200 may proceed to step 210. Otherwise, method 200 may remain at step 208 until the redirection or copy back operation has completed.

At step 210, storage interface 106 may redirect all current and active write I/O directed to the selected source storage resource 112 to the spare storage resource 112. At step 212, for each unit of data (e.g., RAID strip) redirected, storage interface 106 may write a corresponding entry to redirect mapping table 114 identifying a first address of the source storage resource 112 to which the write I/O associated with the unit of data was directed and identifying a second address of the spare storage resource 112 to which the write I/O was redirected and stored.

At step 214, storage interface 106 may determine whether a condition for copy back from the spare storage resource 112 to a source storage resource 112 has occurred. In some embodiments, the condition may include a passage of time since the most recent copy back process. Such interval of time may be chosen to be a short enough period of time to render wear of the member storage resources 112 reasonably even over the expected life of the virtual storage resource. Accordingly, in such embodiments, storage interface 106 may periodically initiate a copy back write I/O data from the spare storage resource 112 to the source storage resource 112 from which the data was redirected at set intervals (e.g., once a week, twice a month, etc.) In some of such embodiments, such interval of time may be variable to account for wear (e.g., the interval may be shortened if write I/O wear is rapidly increasing and redirected write I/O may fill spare storage resource 112; or the interval may be increased otherwise), so as to render wear leveling amongst member storage resources 112 and the spare storage resource 112 as smooth as possible while avoiding too many source storage resource 112 changes within a short duration. In other embodiments, the condition may comprise a wear level of the spare storage resource 112 attaining a particular threshold (e.g., a decrease in write endurance of the spare storage resource 112 by a particular percentage of its maximum write endurance). In yet other embodiments, the condition may comprise an I/O level of the spare storage resource 112 attaining a particular threshold (e.g., a decrease in storage capacity of the spare storage resource 112 by a particular percentage of its maximum storage capacity). If the condition for copy back has occurred, method 200 may proceed to step 216. Otherwise, method 200 may remain at step 214 until the condition for write redirection has occurred.

At step 216, storage interface 106 may determine whether a redirection or copy back operation is presently occurring between a member storage resource 112 and the spare storage resource 112. If a redirection or copy back operation is not presently occurring between a member storage resource 112 and the spare storage resource 112, method 200 may proceed to step 218. Otherwise, method 200 may remain at step 216 until the redirection or copy back operation has completed.

At step 218, storage interface 106 may initiate the copying back of write I/O redirected to spare storage resource 112 to the source storage resource 112, in accordance with information set forth in redirect mapping table 114. During such copy back operation, storage interface 106 may freeze the contents of redirect mapping table 114 and as new write I/O is directed to the source storage resource 112, the new write I/O may be written to the source storage resource 112 and for all such write I/O taking place during the copy back operation, storage interface 106 may add an entry to copy back mapping table 116 identifying addresses of source storage resource 112 to which such write I/O is written during copy back. As a result, copy back may be limited to copying back data for entries appearing in redirect mapping table 114 but not in copy back mapping table 116 so that newer write I/O is not overwritten by the copy back operation. At step 219, storage interface 106 may write entries corresponding to copied back write I/O to copy back mapping table 116.

At step 220, storage interface 106 may determine if any member storage resource 112 or the spare storage resource 112 has reached the end of its write endurance. If any member storage resource 112 or the spare storage resource 112 has reached the end of its write endurance, method 200 may end. Otherwise, method 200 may proceed again to step 204.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof, or any other suitable system operable to implement method 200. In certain embodiments, method 200 may be implemented partially or fully in software and/or firmware embodied in computer-readable media.

Figure 3:
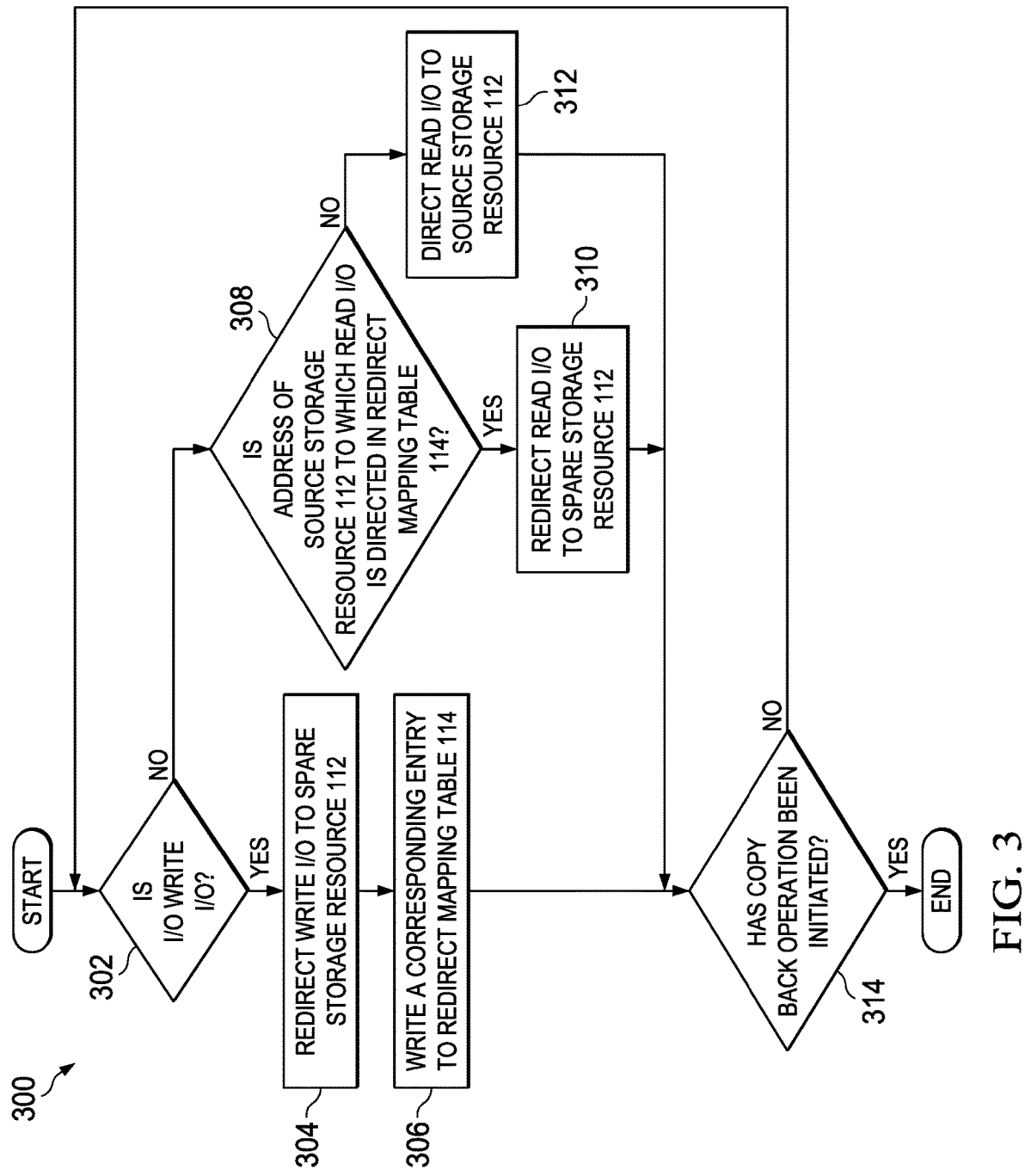
FIG. 3 illustrates a flow chart of an example method for write redirection and read handling during write redirection, in accordance with embodiments of the present disclosure.

FIG. 3 illustrates a flow chart of an example method 300 for write redirection and read handling during write redirection, in accordance with embodiments of the present disclosure. According to certain embodiments, method 300 may begin at step 302. As noted above, teachings of the present disclosure may be implemented in a variety of configurations of system 100 as shown in FIG. 1. As such, the preferred initialization point for method 300 and the order of the steps comprising method 300 may depend on the implementation chosen.

At step 302, storage interface 106 may determine if I/O received for a source storage resource 112 selected for redirection is write I/O or read I/O. If write I/O, method 300 may proceed to step 304. Otherwise, if read I/O, method 300 may proceed to step 308.

At step 304, responsive to receipt of write I/O during a redirection operation, storage interface 106 may cause the write I/O to be redirected to the spare storage resource 112 such that data of the write I/O is written to spare storage resource 112. At step 306, storage interface 106 may write a corresponding entry to redirect mapping table 114 identifying a first address of the source storage resource 112 to which the write I/O was directed and identifying a second address of the spare storage resource 112 to which the write I/O was redirected and stored. After completion of step 306, method 300 may proceed to step 314.

At step 308, responsive to receipt of read I/O during a redirection operation, storage interface 106 may determine whether the address of the source storage resource 112 to which the read I/O is directed appears in an entry of redirect mapping table 114. If the address of the source storage resource 112 to which the read I/O is directed appears in an entry of redirect mapping table 114, method 300 may proceed to step 310. Otherwise, method 300 may proceed to step 312.

At step 310, responsive to the address of the source storage resource 112 to which the read I/O is directed appearing in an entry of redirect mapping table 114, storage interface 106 may redirect the read I/O to an address of the spare storage resource 112 indicated by redirect mapping table 114 to have data responsive to the read I/O returned. After completion of step 310, method 300 may proceed to step 314.

At step 312, responsive to the address of the source storage resource 112 to which the read I/O is directed not appearing in an entry of redirect mapping table 114, storage interface 106 may simply cause the responsive data to be read from the source storage resource 112.

At step 314, storage interface 106 may determine if a copy back operation has been initiated (e.g., in response to satisfaction of a condition as discussed with regards to step 214 of method 200). If a copy back operation has been initiated, method 300 may end. Otherwise, method 300 may proceed again to step 302 for the next I/O operation directed to the source storage resource 112.

Although FIG. 3 discloses a particular number of steps to be taken with respect to method 300, it may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, components thereof, or any other suitable system operable to implement method 300. In certain embodiments, method 300 may be implemented partially or fully in software and/or firmware embodied in computer-readable media.

Figure 4:
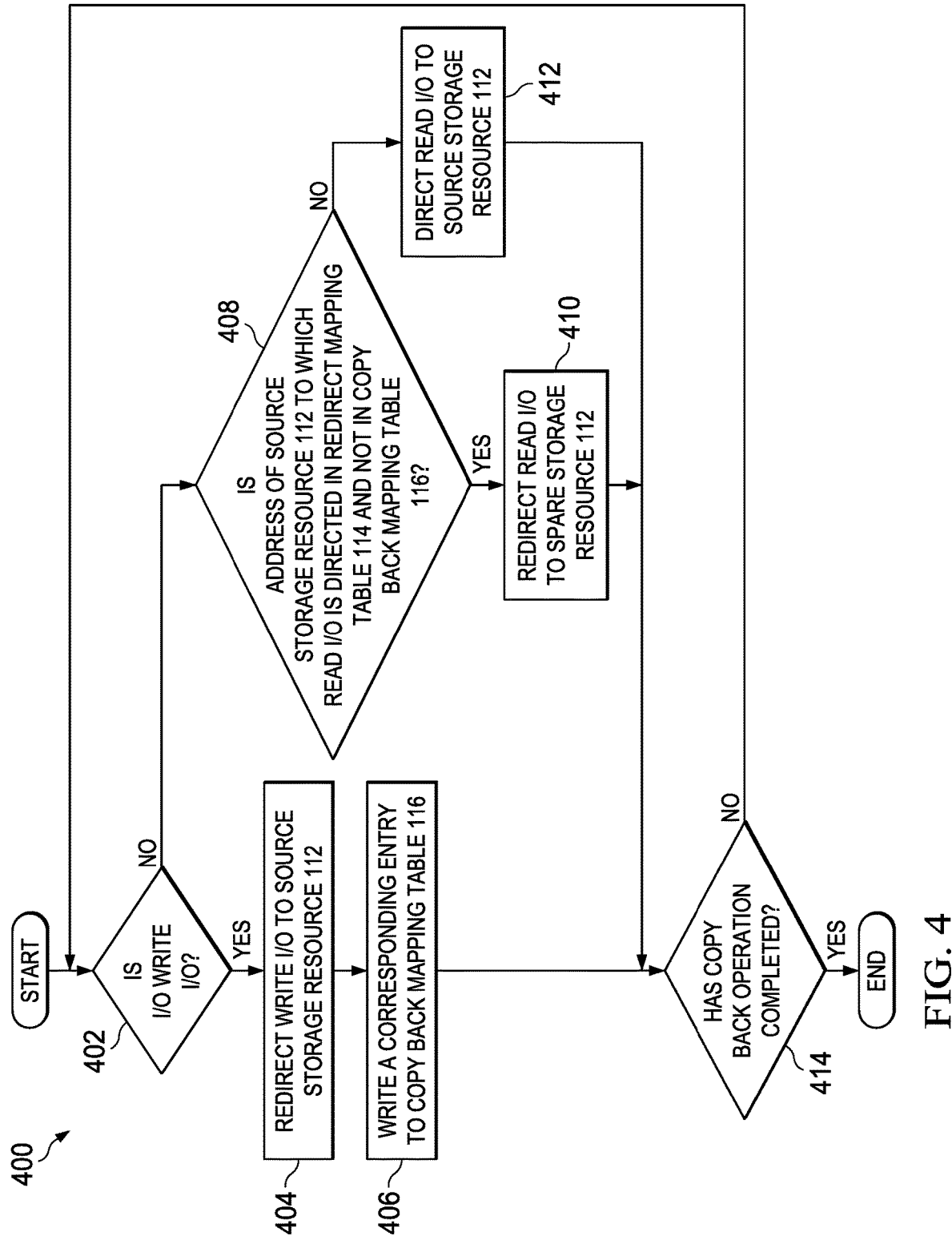
FIG. 4 illustrates a flow chart of an example method for I/O handling during copyback, in accordance with embodiments of the present disclosure.

FIG. 4 illustrates a flow chart of an example method 400 for I/O handling during copyback, in accordance with embodiments of the present disclosure. According to certain embodiments, method 400 may begin at step 402. As noted above, teachings of the present disclosure may be implemented in a variety of configurations of system 100 as shown in FIG. 1. As such, the preferred initialization point for method 400 and the order of the steps comprising method 400 may depend on the implementation chosen.

At step 402, storage interface 106 may determine if I/O received at a source storage resource 112 during a copy back operation is write I/O or read I/O. If write I/O, method 400 may proceed to step 404. Otherwise, if read I/O, method 400 may proceed to step 408.

At step 404, responsive to receipt of write I/O during a copy back operation, storage interface 106 may cause the write I/O to be directed to the source storage resource 112 such that data of the write I/O is written directly to source storage resource 112. At step 406, storage interface 106 may write a corresponding entry to copy back mapping table 116 identifying an address of the source storage resource 112 to which the write I/O was directed. After completion of step 406, method 400 may proceed to step 414.

At step 408, responsive to receipt of read I/O during a copy back operation, storage interface 106 may determine whether the address of the source storage resource 112 to which the read I/O is directed appears in an entry of redirect mapping table 114 but does not also appear in an entry of copy back mapping table 116. If the address of the source storage resource 112 to which the read I/O is directed appears in an entry of redirect mapping table 114 but does not also appear in an entry of copy back mapping table 116, method 400 may proceed to step 410. Otherwise, method 400 may proceed to step 412.

At step 410, responsive to the address of the source storage resource 112 to which the read I/O is directed appearing in an entry of redirect mapping table 114 but not appearing in an entry of copy back mapping table 116, storage interface 106 may redirect the read I/O to an address of the spare storage resource 112 indicated by redirect mapping table 114 to have data responsive to the read I/O returned. After completion of step 410, method 400 may proceed to step 414.

At step 412, responsive to the address of the source storage resource 112 to which the read I/O is directed not appearing in an entry of redirect mapping table 114 or appearing in an entry of copy back mapping table 116, storage interface 106 may simply cause the responsive data to be read from the source storage resource 112.

At step 414, storage interface 106 may determine if the copy back operation has been completed. If the copy back operation has been completed, method 400 may end. Otherwise, method 400 may proceed again to step 402 for the next I/O operation directed to the source storage resource 112 during the copy back operation.

Although FIG. 4 discloses a particular number of steps to be taken with respect to method 400, it may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100, components thereof, or any other suitable system operable to implement method 400. In certain embodiments, method 400 may be implemented partially or fully in software and/or firmware embodied in computer-readable media.

Figure 5:
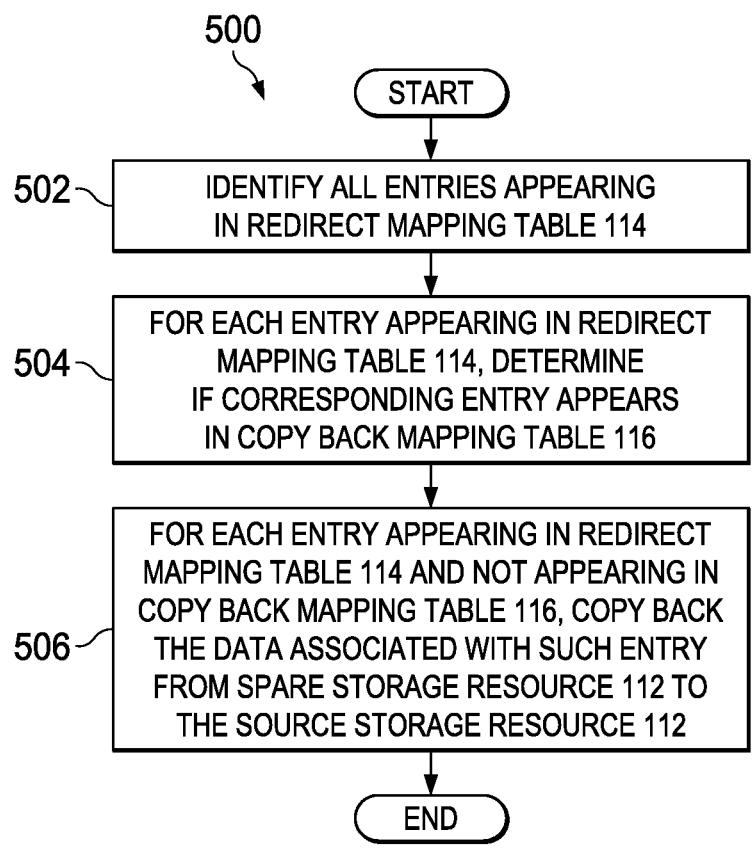
FIG. 5 illustrates a flow chart of an example method for copyback from a spare storage resource to an active storage resource, in accordance with embodiments of the present disclosure.

FIG. 5 illustrates a flow chart of an example method 500 for copyback from a spare storage resource to an active storage resource, in accordance with embodiments of the present disclosure. According to certain embodiments, method 500 may begin at step 502. As noted above, teachings of the present disclosure may be implemented in a variety of configurations of system 100 as shown in FIG. 1. As such, the preferred initialization point for method 500 and the order of the steps comprising method 500 may depend on the implementation chosen.

At step 502, storage interface 106 may identify all entries appearing in redirect mapping table 114. At step 504, storage interface 106 may, for each entry appearing in redirect mapping table 114, determine if a corresponding entry appears in copy back mapping table 116. At step 506, for each entry appearing in redirect mapping table 114 and not appearing in copy back mapping table 116, storage interface 106 may consider all such entries as candidates for copy back and may copy back the data associated with such entry from spare storage resource 112 to the source storage resource 112.

Although FIG. 5 discloses a particular number of steps to be taken with respect to method 500, it may be executed with greater or lesser steps than those depicted in FIG. 5. In addition, although FIG. 5 discloses a certain order of steps to be taken with respect to method 500, the steps comprising method 500 may be completed in any suitable order.

Method 500 may be implemented using system 100, components thereof, or any other suitable system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
   at least one processor; and
   a storage interface configured to:
      sequentially select member storage resources of a virtual storage resource as a source storage resource for redirection of write input/output (I/O);
      for each member storage resource, when selected as the source storage resource, change a configuration of the virtual storage resource from an original configuration to a redirect configuration by, in response to write I/O, redirecting the write I/O from a first address of the source storage resource to a second address of a spare storage resource available to the virtual storage resource, wherein the spare storage resource is a hot spare storage resource of the virtual storage resource;
      maintain a redirect mapping table of respective first addresses and corresponding second addresses;
      in response to a detection that a copy back condition has occurred, initiate a copy back operation configured to return the virtual storage resource to the original configuration, wherein the copy back condition comprises a wear level of the spare storage resource and/or an I/O level of the spare storage resource; and
      maintain a copy back mapping table indicative of data of the source storage resource which is not to be overwritten during the copy back operation.

2. The system of claim 1, the storage resource further configured to, responsive to the detection of the copy back condition, copy back data associated with the write I/O redirected to the spare storage resource from the spare storage resource to the source storage resource.

3. The system of claim 2, wherein the storage resource is configured to copy back only data associated with the write I/O redirected to the spare storage resource and unmodified by write I/O directed to the source storage resource occurring after occurrence of the copy back condition.

4. The system of claim 2, wherein the copy back condition further comprises a passage of a duration of time since a previous copy back of data from the spare storage resource to a member storage resource.

5. The system of claim 4, wherein the duration of time is based on a wear level of at least one of:
   the spare storage resource; and
   one of the member storage resources.

6. The system of claim 2, wherein the storage interface is configured to, in response to read I/O associated with particular data of the source storage resource, redirect the read I/O to the spare storage resource if the particular data was associated with a write I/O redirected to the spare storage resource and unmodified by write I/O directed to the source storage resource occurring after occurrence of the condition.

7. The system of claim 1, the storage resource further configured to, for each member storage resource, when selected as the source storage resource, redirect the write I/O to the spare storage resource responsive to occurrence of a condition for redirecting write I/O.

8. The system of claim 7, wherein the condition for redirecting further comprises one of:
   a passage of a duration of time since a previous redirection of data from a member storage resource to the spare storage resource;
   a wear level of the source storage resource attaining a particular threshold; and
   an I/O level of the source storage resource attaining a particular threshold.

9. The system of claim 1, wherein the storage interface is configured to, in response to read I/O associated with particular data of the source storage resource, redirect the read I/O to the spare storage resource if the particular data was associated with a write I/O redirected to the spare storage resource.

10. The system of claim 1, wherein the storage interface is configured such that no data other than the redirected write I/O is written from the source storage resource to the spare storage resource.

11. A method comprising:
    sequentially selecting member storage resources of a virtual storage resource as a source storage resource for redirection of write input/output (I/O);
    for each member storage resource, when selected as the source storage resource, change a configuration of the virtual storage resource from an original configuration to a redirect configuration by, in response to write I/O, redirecting the write I/O from a first address of the source storage resource to a second address of a spare storage resource available to the virtual storage resource, wherein the spare storage resource is a hot spare storage resource of the virtual storage resource;
    maintaining a redirect mapping table of respective first addresses and corresponding second addresses;
    in response to a detection that a copy back condition has occurred, initiating a copy back operation configured to return the virtual storage resource to the original configuration, wherein the copy back condition comprises a wear level of the spare storage resource and/or an I/O level of the spare storage resource; and
    maintaining a copy back mapping table indicative of data of the source storage resource which is not to be overwritten during the copy back operation.

12. The method of claim 11, further comprising, responsive to the detection of the copy back condition, copying back data associated with the write I/O redirected to the spare storage resource from the spare storage resource to the source storage resource.

13. The method of claim 12, further comprising copying back only data associated with the write I/O redirected to the spare storage resource and unmodified by write I/O directed to the source storage resource occurring after occurrence of the copy back condition.

14. The method of claim 12, wherein the copy back condition further comprises a passage of a duration of time since a previous copy back of data from the spare storage resource to a member storage resource.

15. The method of claim 14, wherein the duration of time is based on a wear level of at least one of:
the spare storage resource; and
one of the member storage resources.

16. The method of claim 12, further comprising, in response to read I/O associated with particular data of the source storage resource, redirecting the read I/O to the spare storage resource if the particular data was associated with a write I/O redirected to the spare storage resource and unmodified by write I/O directed to the source storage resource occurring after occurrence of the condition.

17. The method of claim 11, further comprising, for each member storage resource, when selected as the source storage resource, redirecting the write I/O to the spare storage resource responsive to occurrence of a condition for redirecting write I/O.

18. The method of claim 17, wherein the condition for redirecting further comprises one of:
a passage of a duration of time since a previous redirection of data from a member storage resource to the spare storage resource;
a wear level of the source storage resource attaining a particular threshold; and
an I/O level of the source storage resource attaining a particular threshold.

19. The method of claim 11, further comprising, in response to read I/O associated with particular data of the source storage resource, redirecting the read I/O to the spare storage resource if the particular data was associated with a write I/O redirected to the spare storage resource.

20. The method of claim 11, wherein no data other than the redirected write I/O is written from the source storage resource to the spare storage resource.

21. An article of manufacture comprising:
a non-transitory computer readable medium; and
computer-executable instructions carried on the computer readable medium, the instructions readable by at least one processor, the instructions, when read and executed, for causing the at least one processor to:
sequentially select member storage resources of a virtual storage resource as a source storage resource for redirection of write input/output (I/O);
for each member storage resource, when selected as the source storage resource, change a configuration of the virtual storage resource from an original configuration to a redirect configuration by, in response to write I/O, redirecting the write I/O from a first address of the source storage resource to a second address of a spare storage resource available to the virtual storage resource, wherein the spare storage resource is a hot spare storage resource of the virtual storage resource;
maintain a redirect mapping table of respective first addresses and corresponding second addresses;
in response to a detection that a copy back condition has occurred, initiate a copy back operation configured to return the virtual storage resource to the original configuration, wherein the copy back condition comprises a wear level of the spare storage resource and/or an I/O level of the spare storage resource; and
maintain a copy back mapping table indicative of data of the source storage resource which is not to be overwritten during the copy back operation.

* * * * *